(12) United States Patent
Laing

(10) Patent No.: US 6,354,813 B1
(45) Date of Patent: Mar. 12, 2002

(54) HYDRAULICALLY ACTIVATED THREE-WAY-VALVE

(76) Inventor: Karsten Andreas Laing, 1253 La Jolla Rancho Rd., La Jolla, CA (US) 92037

( * ) Notice: Subject to any disclaimer, the term of this patent is extended or adjusted under 35 U.S.C. 154(b) by 0 days.

(21) Appl. No.: 09/544,242

(22) Filed: Apr. 5, 2000

(30) Foreign Application Priority Data

Apr. 8, 1999 (DE) .......................................... 199 15 773

(51) Int. Cl.[7] .............................................. F04B 49/00
(52) U.S. Cl. ..................................... 417/291; 137/625.5
(58) Field of Search ................................ 417/291, 479, 417/393; 251/29, 61.2; 137/625.5, 883; 237/8 R; 303/119; 141/39; 210/416.1

(56) References Cited

U.S. PATENT DOCUMENTS

| | | | | |
|---|---|---|---|---|
| 3,837,615 A | * | 9/1974 | Espeel | 251/29 |
| 3,868,969 A | * | 3/1975 | Schwenk | 137/625.5 |
| 3,897,903 A | * | 8/1975 | Race | 237/8 R |
| 4,175,590 A | * | 11/1979 | Grandclement | 137/883 |
| 4,196,941 A | * | 4/1980 | Goebels | 303/119 |
| 4,276,004 A | * | 6/1981 | Hahn | 417/479 |
| 4,787,427 A | * | 11/1988 | Bacroix et al. | 141/39 |
| 5,139,225 A | * | 8/1992 | Olson et al. | 251/61.2 |
| 5,261,798 A | * | 11/1993 | Budde | 417/393 |
| 6,171,495 B1 | * | 1/2001 | Drori | 210/416.1 |

* cited by examiner

Primary Examiner—Teresa Walberg
Assistant Examiner—Leonid Fastovsky

(57) ABSTRACT

A three-way-valve is actuated by fluid which moves membranes.

16 Claims, 3 Drawing Sheets

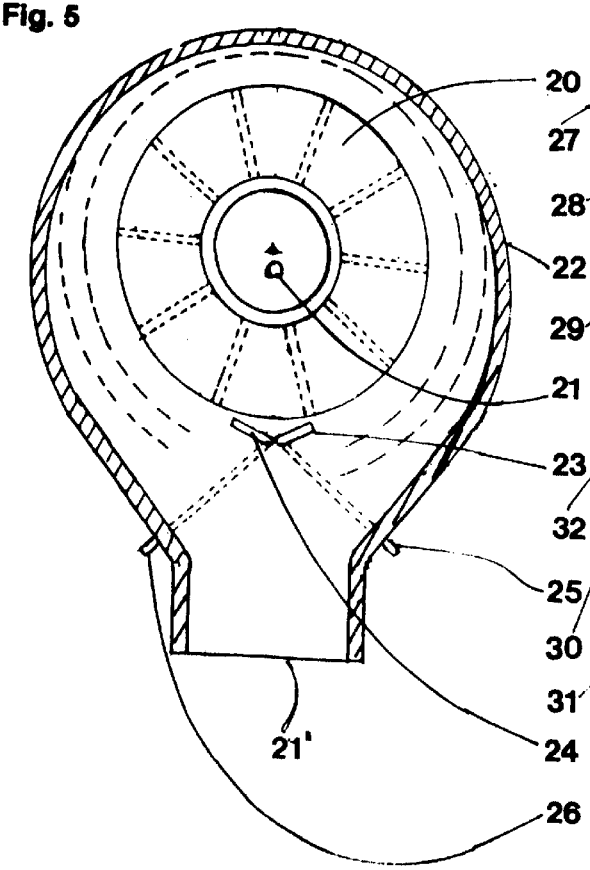
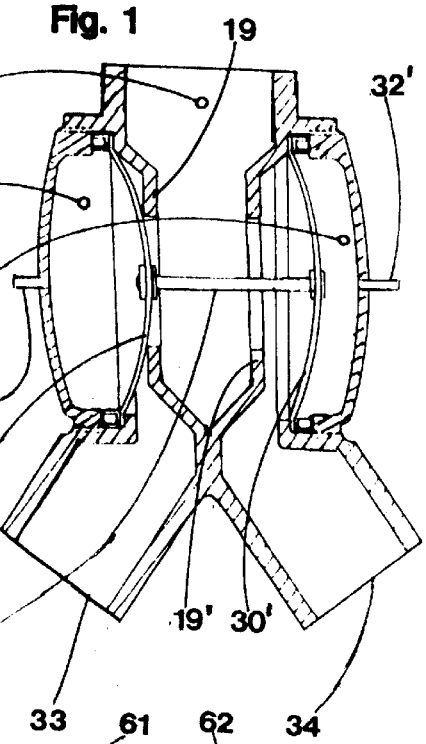
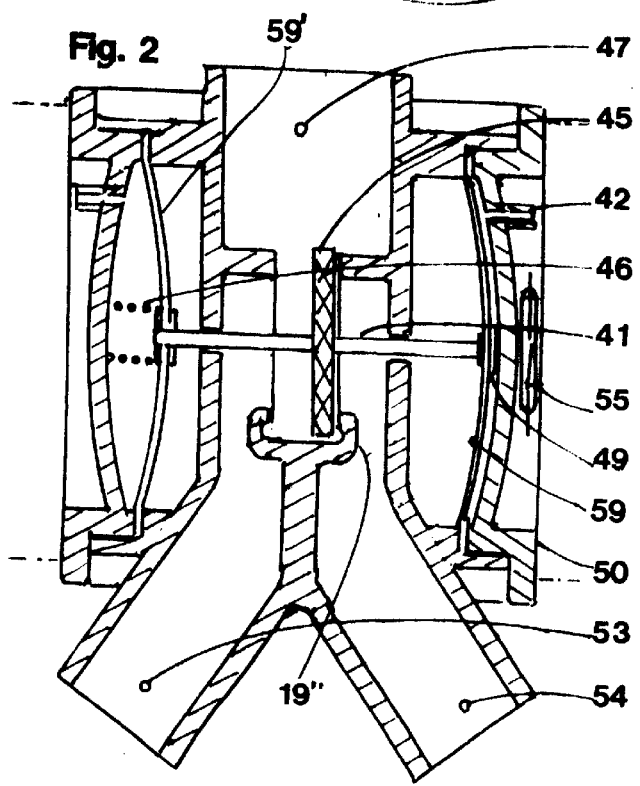
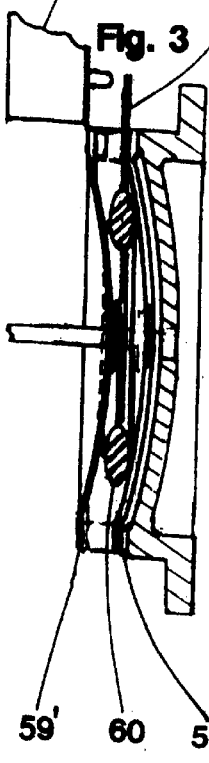
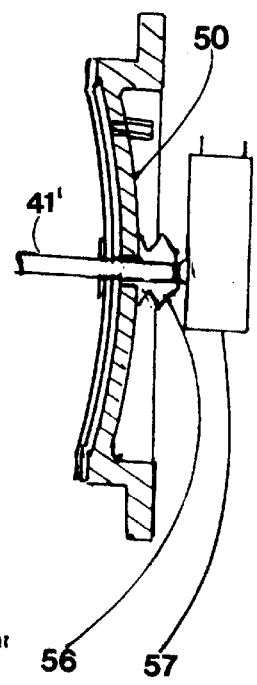

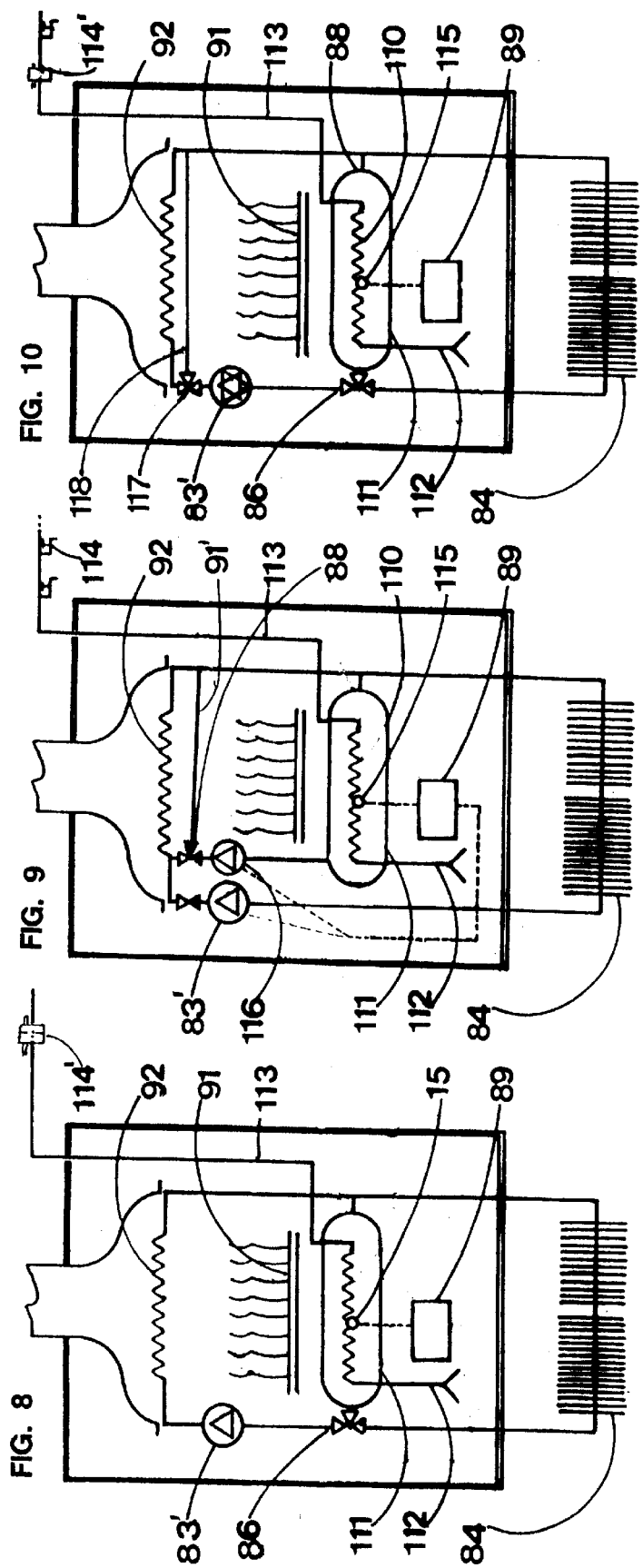

HYDRAULICALLY ACTIVATED THREE-WAY-VALVE

FIELD OF THE INVENTION

The invention relates to hydraulically activated three-way-valves, especially for gas-fired instantaneous hot water supply systems.

PRIOR ART

Instantaneous gas-boilers are known which can switch between domestic hot water production and hydronic room heating. In both cases water acts as a heat carrier. This water passes either through the radiators or through a heat exchanger which transfers heat from a water circuit to domestic hot water. In these cases the generation of domestic hot water has preference to the room-heating. The switching between the two circuits is performed by a three-way-valve. This three-way-valve can be activated by reversing the rotation of the circulator pump. The disadvantage is that a first valve element has to be connected to the second valve element by a traverse which can lead to a blockage or to leaking.

SUMMARY OF THE INVENTION

The invention prevents these disadvantages. The invention refers to three-way-valves which are activated hydraulically. The valves according to the invention comprise membranes, which separate a fluid chamber from the water circuit. The membranes for instance can be connected to two pressure sensors which are located close to the periphery of a reversible pump impeller or they can be connected to both sides of an orifice within the hot water circuit. The three-way-valves are also suitable for swimming pools. An object of the invention is also the coordination with the elements of an instantaneous gas heater or of a swimming pool-installation.

BRIEF DESCRIPTION OF THE DRAWINGS

FIG. 1 shows a cross-section through a three-way-valve.

FIG. 2 shows an embodiment with a valve disc.

FIG. 3 shows a membrane activating a switch

FIG. 4 shows another variation to activate a switch.

FIG. 5 shows a cross-section through the pressure side of a rotation-reversible circulator plump.

FIG. 8 shows an instantaneous gas-heater with three-way-valve and orifice in the domestic hot water pipe.

FIG. 9 shows an instantaneous gas-heater with two circulator pumps and one three-way-valve for the bypass-pipe leading to the gas-water-heat-exchanger.

FIG. 10 shows a unit with two three-way-valves.

DETAILED DESCRIPTION

Figure 6:
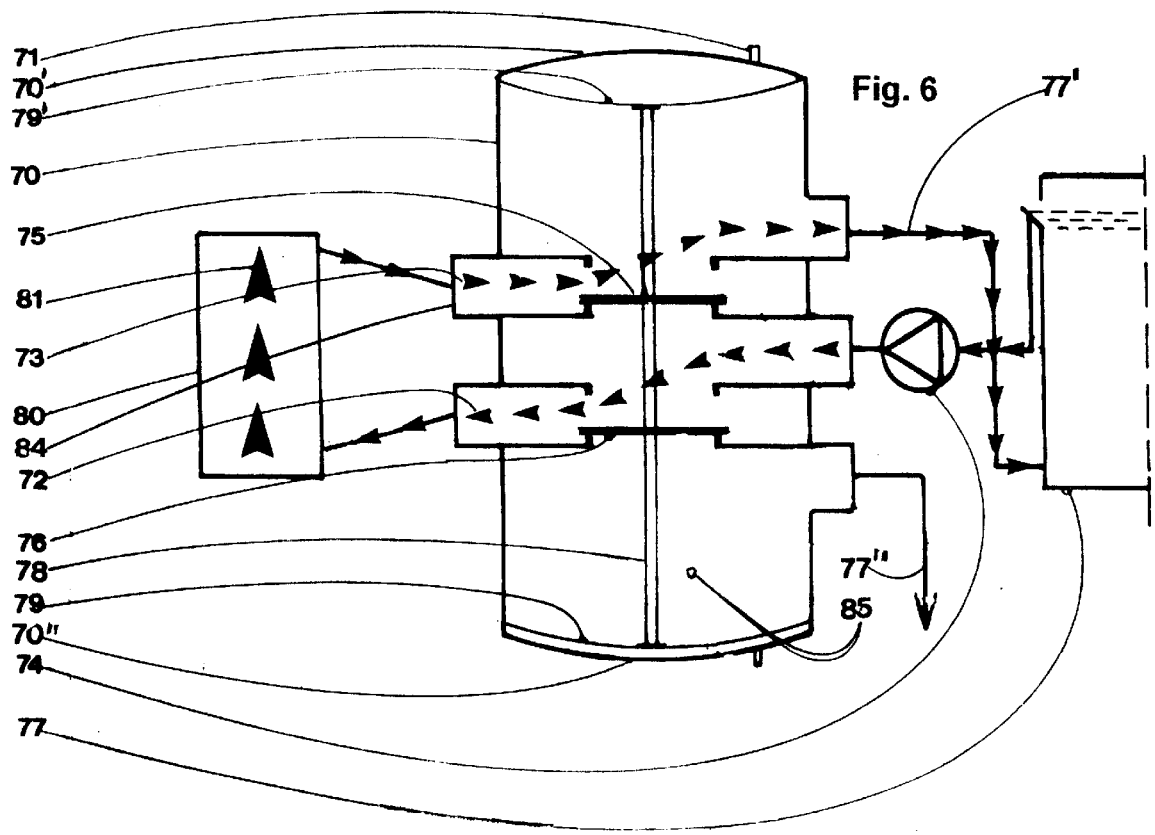
FIG. 6 and 7 show swimming pool-installations.

FIG. 1 shows a three-way-valve according to the invention with the membranes 30 and 30'. The nipple 27 is either connected with the first secondary nipple 33 (FIG. 5) or with the second secondary nipple 34. The nozzle 23 with nipple 26 is connected with nipple 32 of the three-way-valve. If pump impeller 20 in FIG. 5 rotates clockwise, the dynamic pressure pushes the membrane 30 into the position shown, so that now the secondary nipple 34 communicates with the primary nipple 27. Membrane 30 is connected via traverse 31 with the second membrane 30'. When the direction of rotation of the circulator pump is reversed, the nozzle 24 conveys the water via nipple 25 and a connection to the second nipple 32' on the valve into the membrane chamber 29. Now the second membrane 30' is pressed against the valve seat 19' so that now the secondary nipple 33 is connected with primary nipple 27. It can be advantageous that the housing of the three-way-valve forms a unit with the housing 22 of the circulator pump.

FIG. 2 shows an alternative solution in which the traverse 41 forms a unit with a valve disk 45. When fluid flows through nipple 42, valve disc 45 is moved in the other, not shown position. As soon as the pressure ceases, helical spring 46 moves the valve disc 45 back into the position shown in the drawing. In this position of the valve the primary nipple 47 communicates with the secondary nipple 54. If the valve is supposed to switch a motor on and off, a permanent magnet 49 is attached to the traverse 41. This magnet 49 activates in its end-position Reed-switch 55.

Another way to switch the pump is shown in FIG. 3. In this design, two membranes 59' and 59" are arranged at one side of the three-way-valve with a ring 60 with oval cross-section between the two membranes. A short rod 62 is attached to this ring 60 which leads to the outside and activates switch 61.

FIG. 4 shows a third solution in which the traverse 41' extends through the wall 50, whereby it is sealed by a bellow 56.

If a circulator pump with reversal of rotation is used according to FIG. 5, two nipples 32, 32' (FIG. 1) can be provided so that—at a pump-rotation clockwise—the membrane 30 (FIG. 1) will be moved, while at a counter-clockwise rotation of the pump the membrane 30' will be moved. If however only one pressure source for the hydraulic fluid is available, it will be connected to nipple 42 (FIG. 2). As soon as no pressure is applied, spring 46 moves both membranes and the valve disc 45 against valve seat 19", so that the secondary nipple 53 now is connected with the primary nipple 47.

FIG. 6 shows a valve with two valve discs 75 and 76. The drawing shows such a valve for use in a swimming pool 77. In the shown valve-position, circulator pump 74 conveys water from the pool according to arrows 72 into the filter 80. The filtered water flows along arrows 73 back into the pool 77 the valve comprises a tube 70 with a membrane 79 at one end and 79' at the other end and endplates 70' and 70". The membranes are connected to each other by a traverse 78. The membrane 79 forms together with the valve disc 76 and the ring-shaped valve seats a first chamber, membrane 79' forms together with valve disc 75 and its valve seat a second chamber. Both chambers are connected with outlet nipples. The room between the chambers is divided by two annular chambers forming the valve seats for the valve discs 75 and 76. This room between the chambers is connected to the pressure side of the circulator pump 74. The space of the first annular room 84 is connected with the return line 77' to the pool. The second annular chamber is connected with the entrance of the filter 80.

Figure 7:
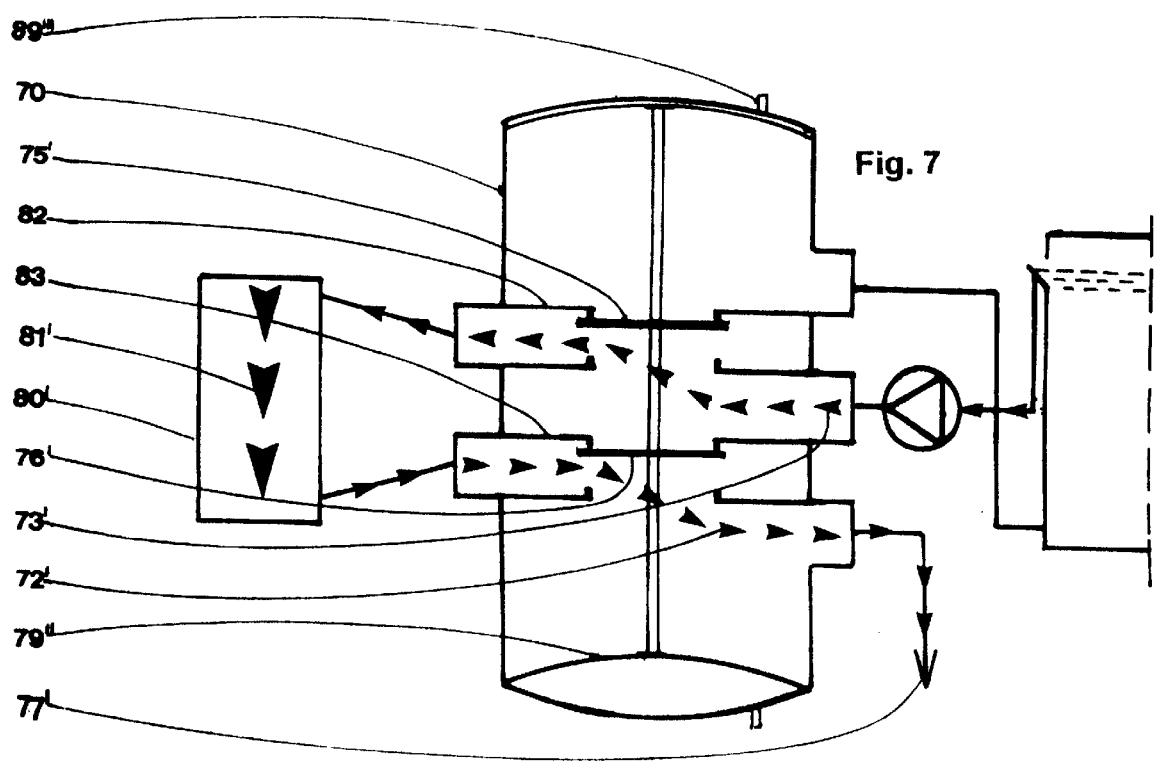

FIG. 7 shows the same valve switched over to filter cleaning. In this position membrane 79" pushes the valve discs 75 and 76 into the second position 75' and 76'. Now the water flows according to arrow 73' to the exit side of the filter 80' and the dirty water, filtered from the pool, flows according to arrow 72' to the sewer pipe 77'.

Another application are instantaneous gas boilers. The gas boiler in FIG. 8 comprises a burner 91, a gas-water-heat exchanger 92 exposed to the gas flame, and a circulator pump 83'. In the first position of the three-way-valve 86 the gas-boiler heats the water of a first circuit, flowing through the radiators 84. In the second position of the three-way-valve 86 the water flows through a second circuit that passes through the heat exchanger 111 and heats the domestic hot water. If heat for room heating is needed, the three-way-valve 86 guides the water through the first circuit. As soon as a tap in the domestic hot water circuit is opened, water flows through orifice 114' with two nipples, which are connected to the nipple 42 in FIG. 2. Orifice 114' creates a pressure-difference for the water before and behind orifice 114'. This pressure difference activates the three-way-valve 86.

FIG. 9 shows a system with two circulator pumps 83' and 116. Pump 83' heats the water for the radiator system 84. A three-way-valve guides the water of this pump 83' through the gas-water-heat-exchanger 92 as long as the gas flame is burning. As soon as the flame is extinct, the three-way-valve 88, whose membrane is exposed to the gas pressure, switches to the second position, and the second pump 116 guides the water through bypass pipe 91'. It has been proven that the waste heat of the motor of pump 116 is sufficient to replace the heat loss of the warm water in the well insulated heat transfer unit 111, and to keep the water sufficient warm to deliver immediately warm water into the heat exchanger pipe 115 and to its faucets.

FIG. 10 shows another solution, in which the second circulator pump 116 is replaced by an additional three-way-valve 86, which connects the heated water with the heat exchanger 111 By changing the sense of rotation of the circulator pump 83' the three-way-valve 86 guides the water to the radiators 84. A second three-way-valve 117 is activated by the orifice 114' in pipe 113 such that after opening a faucet the water flows through the gas-water-heat-exchanger 92. As soon as the faucet will be closed and no radiator 84 requires any heat, the water flows through the bypass-pipe 118.

I claim:

1. The combination of a three-way-valve and a centrifugal pump, the valve having a primary nipple that branches out into two secondary nipples and with means to guide the flow of the primary nipple alternatively through the first or the second of the secondary nipples, the guide means having two membranes (30, 30', 59, 59') which are connected to each other by a traverse (31, 41) and the side of the membrane averted from the flow forms together with a cavity of the valve-housing a membrane chamber (28, 29) into which a hydraulic fluid can be conveyed under pressure, whereby the membrane experiences a reversal from a connection of the primary nipple (27, 47) with a first of the secondary nipples (34, 53) to a connection between the primary nipple (27, 47) and the second (33, 54) of the secondary nipples, said hydraulic fluid being pressured by the ram-pressure of a nozzle (24), which is part of the centrifugal pump (22) and is positioned close to the periphery of the pump-impeller (21).

2. The combination of a three-way-valve and a centrifugal pump according to claim 1, wiht a connection between the nozzle (24) via nipple (25) and the membrane chamber (29) via nipple (32', 42'), whereby the membrane (59') is pre-stressed by a spring (46) and that the spring (46) keeps the membrane (59') in a first position until the pressure of the hydraulic fluid of the nozzle (24) moves the membranes (59, 59') into the second position.

3. The combination of a three-way-valve and a centrifugal pump according to claim 1, characterized in that the membrane (30 or 30') is pressed against an opening (19, 19') forming the valve seat when the hydraulic fluid is conveyed into the relevant membrane chamber (28 or 29).

4. The combination of a three-way-valve and a centrifugal pump according to claim 1, characterized in that the movement of the membrane activates a switch (57, 61).

5. The combination of a three-way-valve and a centrifugal pump according to claim 4, characterized in that a permanent magnet (49) is attached to the traverse (41), which in one of the end-positions of the traverse (41) activates a switch (55).

6. The combination of a three-way-valve and a centrifugal pump according to claim 4, characterized in that within the membrane chamber two membranes (59' and 59") are arranged in series, whereby one membrane (59') is in contact with the fluid conveyed, and the second membrane (59") is in contact with the fluid in the membrane chamber.

7. The combination of a three-way-valve and a centrifugal pump according to claim 4, characterized in that one of the membranes (59") moves the other membrane (59') via a mechanical connection (60) and that in the space between the membrane (59") and the membrane (59') means (60, 62) are arranged which activate a switch (61).

8. The combination of a three-way-valve and a centrifugal pump according to claim 7, characterized in that the space between the membranes (59' and 59") communicates with the outside air.

9. The combination of a three-way-valve and a centrifugal pump according to claim 4, characterized in that the traverse (41') extends through a hole in the lid (50) of the membrane chamber to the outside and that a bellow (56) prevents a fluid leak and that the part of the traverse (41') which extends to the outside activates a switch (57).

10. The combination of a three-way-valve and a centrifugal pump according to claim 1, characterized in that the fluid that moves the membrane is identical with the fluid conveyed.

11. The combination of a three-way-valve and a centrifugal pump according to claim 1, characterized in that the traverse (78) is connected to more than one valve disc (75 and 76) thus controlling an equal number of circuits.

12. The combination of a three-way-valve and a centrifugal pump according to claim 11, for a pool (77), characterized in that valve discs (75, 76) in a first position of the membranes (79, 79') permit the fluid to flow through filter (80) and in its second position permit the fluid to flow in the opposite direction along arrow (81') through the filter (80') and that the fluid leaving the filter is conveyed to a pipe (77') leading to the outside.

13. The combination of a three-way-valve and a centrifugal pump according to claim 12, characterized in that the valve comprises a tube (70) with at least five nipples for the fluid to be conveyed, membranes (79 and 79') on each end of the tube which are connected to each other by a traverse (78), four annular chambers, each forming two valve seats (82) arranged on both sides of each nipple and between two of the juxtaposed valve seats (82) a valve disc (75, 76), two of the nipples communicating with a filter (80), the third nipple communicating with the circulation pump (74), the fourth nipple leading to the pool (77) and a fifth nipple leading to the sewer pipe (77").

14. The combination of a three-way-valve and a centrifugal pump according to claim 1, characterized in that the rpm of the pump is variable and that the force of the spring (46) is so strong that the traverse (41) can only be moved when the circulator pump (83') has reached its maximum rpm.

15. The combination of a three-way-valve and a centrifugal pump according to claim 1 with two ram-pressure producing nozzles (23, 24) close to the periphery of the pump-impeller (21), the nozzles being positioned close to each other but showing in opposite directions and the first nozzle (24) being connected to the first membrane chamber (29), whereby the rotation of the pump impeller (21) is reversible, the rotation in the opposite direction causes the generation of ram-pressure in nozzle (23) which is connected to the second membrane chamber (28).

16. The combination of a three-way-valve and a centrifugal pump according to claim 11, characterized in that the impeller (21) of pump (22) circulates the water of a pool (77).

* * * * *